US008573183B2

(12) United States Patent
Graham et al.

(10) Patent No.: US 8,573,183 B2
(45) Date of Patent: Nov. 5, 2013

(54) SYSTEM AND METHOD FOR FUEL TANK TUBE ROUTING AND VALVE PLACEMENT TO PREVENT FUEL LEAKS INTO EVAPORATIVE EMISSIONS SYSTEM

(75) Inventors: Jason Anthony Graham, Delaware, OH (US); Scott Jeffrey Volchko, Dublin, OH (US); Tetsuhiro Ito, Dublin, OH (US); Hisayuki Goma, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 783 days.

(21) Appl. No.: 12/836,056

(22) Filed: Jul. 14, 2010

(65) Prior Publication Data
US 2012/0012599 A1    Jan. 19, 2012

(51) Int. Cl.
*B60K 15/035* (2006.01)
*B65D 90/22* (2006.01)
*F02M 37/20* (2006.01)

(52) U.S. Cl.
USPC .............. 123/434; 220/745; 137/43; 137/202

(58) Field of Classification Search
USPC .......... 123/434, 516, 518, 519; 220/745, 746, 220/86.2; 137/2, 202, 583, 587, 590, 43
See application file for complete search history.

(56) References Cited

U.S. PATENT DOCUMENTS

| | | |
|---|---|---|
| 3,777,927 A | 12/1973 | Fricker |
| 3,800,978 A | 4/1974 | Sigwald |
| 3,915,184 A | 10/1975 | Galles |
| 4,699,638 A | 10/1987 | Harris |
| 5,687,778 A | 11/1997 | Harris |
| 5,868,119 A | 2/1999 | Endo et al. |
| 5,983,958 A | 11/1999 | Bergsma et al. |
| 6,017,061 A | 1/2000 | Adachi |
| 6,276,387 B1 | 8/2001 | Pachciarz et al. |
| 6,655,403 B2 * | 12/2003 | Mills .................................. 137/2 |
| 6,772,790 B2 * | 8/2004 | Viebahn et al. ............... 137/592 |
| 7,383,825 B2 * | 6/2008 | Mills ............................. 123/516 |
| 2007/0186976 A1 | 8/2007 | Hilderley et al. |

FOREIGN PATENT DOCUMENTS

| | | |
|---|---|---|
| EP | 133458 | 9/1987 |
| GB | 2286182 | 8/1995 |
| JP | 2006-183596 | 7/2006 |

OTHER PUBLICATIONS

International Search Report and Written Opinion mailed Dec. 2, 2011 in International Application No. PCT/US2011/042327.
International Preliminary Report on Patentability (including Written Opinion of the ISA) mailed Jan. 24, 2013 in International Application No. PCT/US2011/042327.

* cited by examiner

*Primary Examiner* — Hieu T Vo
(74) *Attorney, Agent, or Firm* — Plumsea Law Group, LLC

(57) ABSTRACT

Systems and methods for fuel tank tube routing and valve placement to prevent fuel leaks into the evaporative emissions system are disclosed. An embodiment provides a vehicle fuel tank venting system that uses strategically placed valves and a low profile tube routing to prevent the leakage of liquid fuel to an evaporative emission system in the event of a valve failure. In one aspect, a first and second outlet valve may be positioned such that at least one of the valves is above a full fuel level for a desired range of fuel tank tilted positions. Among the desired range, when the first valve is submerged in fuel, at least a portion of the first outlet tube may be above the full fuel level, and when the second valve is submerged, at least a portion of the second outlet tube may be above the full fuel level.

20 Claims, 12 Drawing Sheets

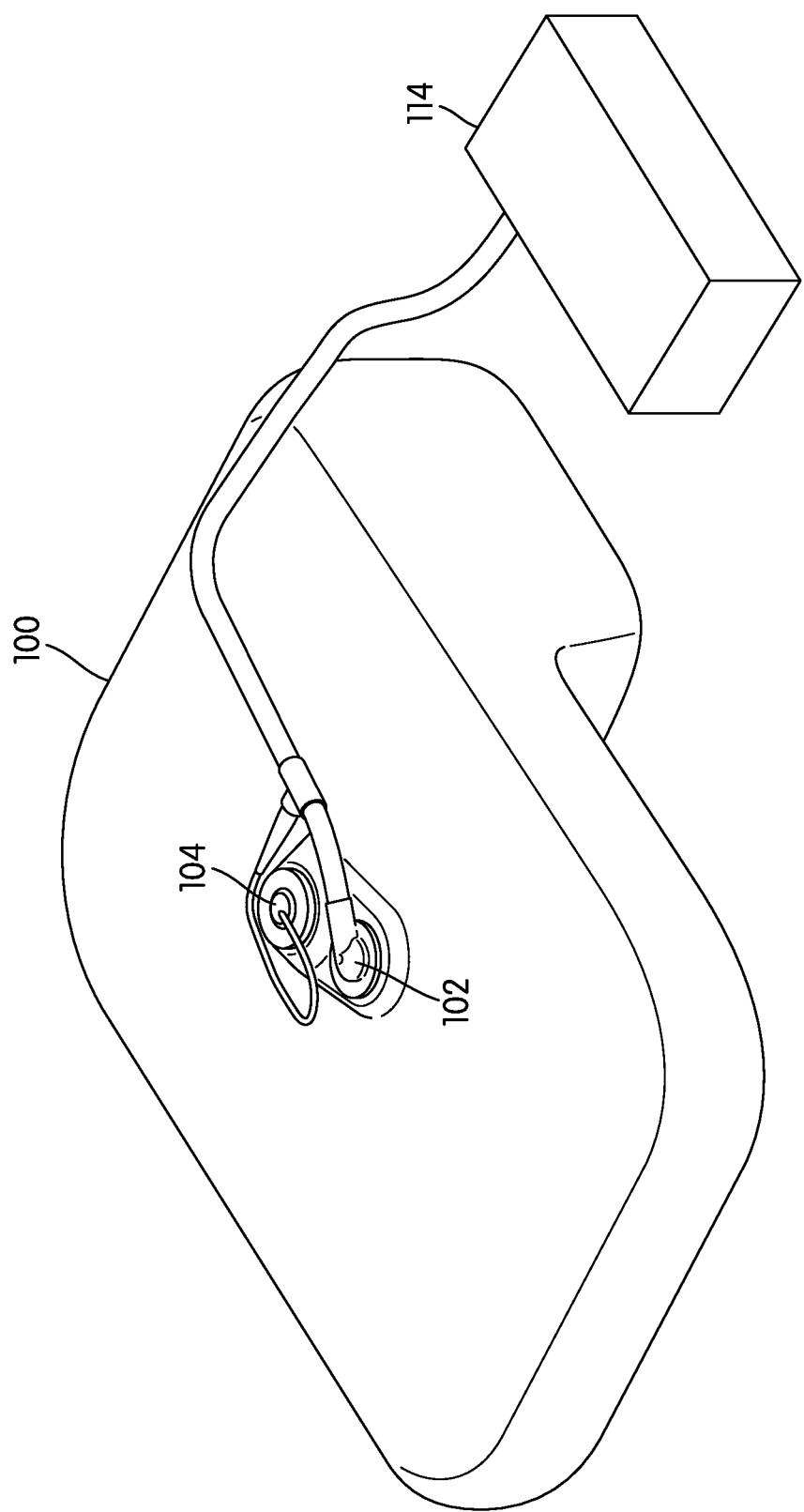
FIG. 1.1
PRIOR ART

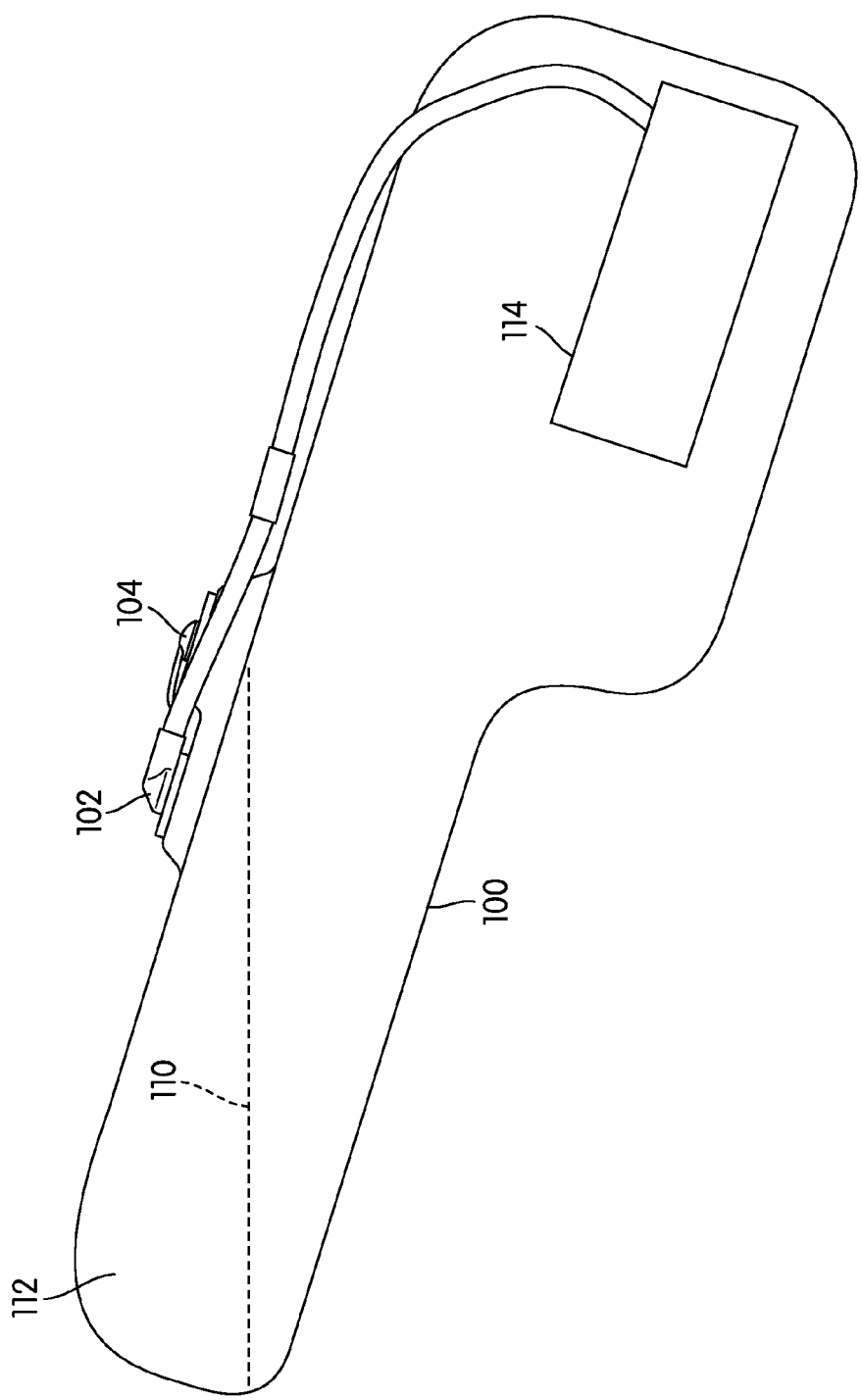
FIG. 1.2
PRIOR ART

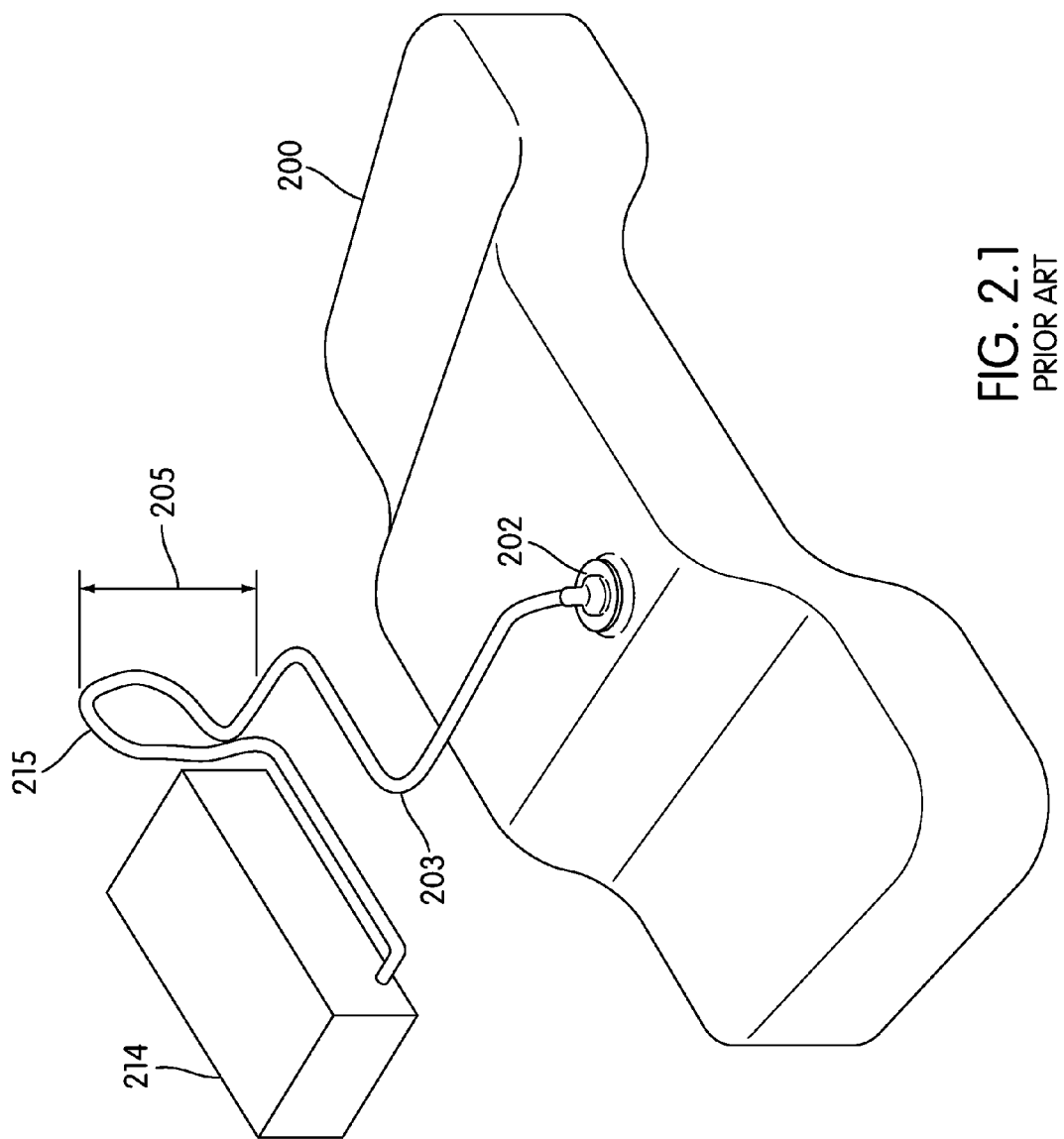
FIG. 2.1
PRIOR ART

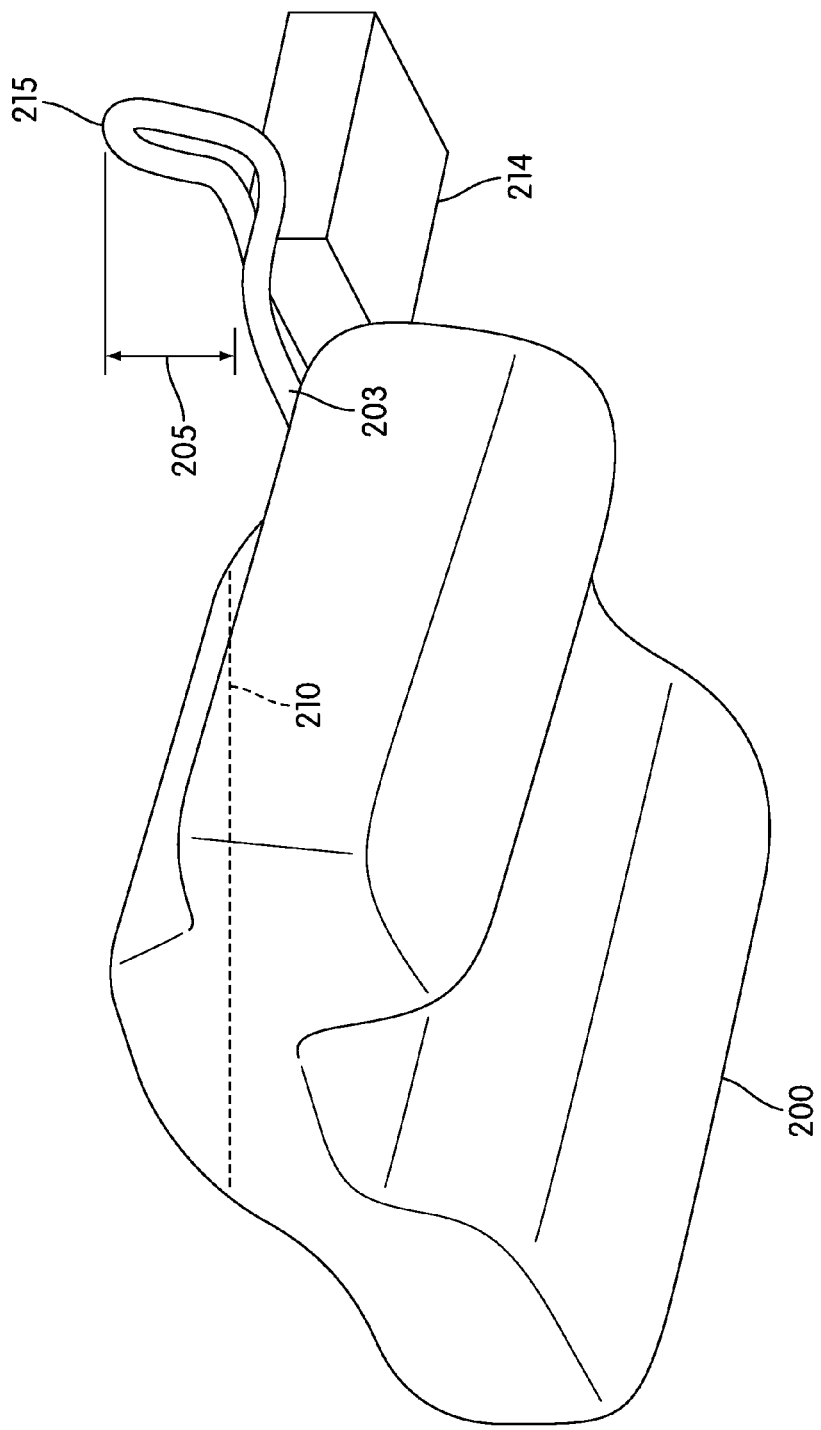
FIG. 2.2
PRIOR ART

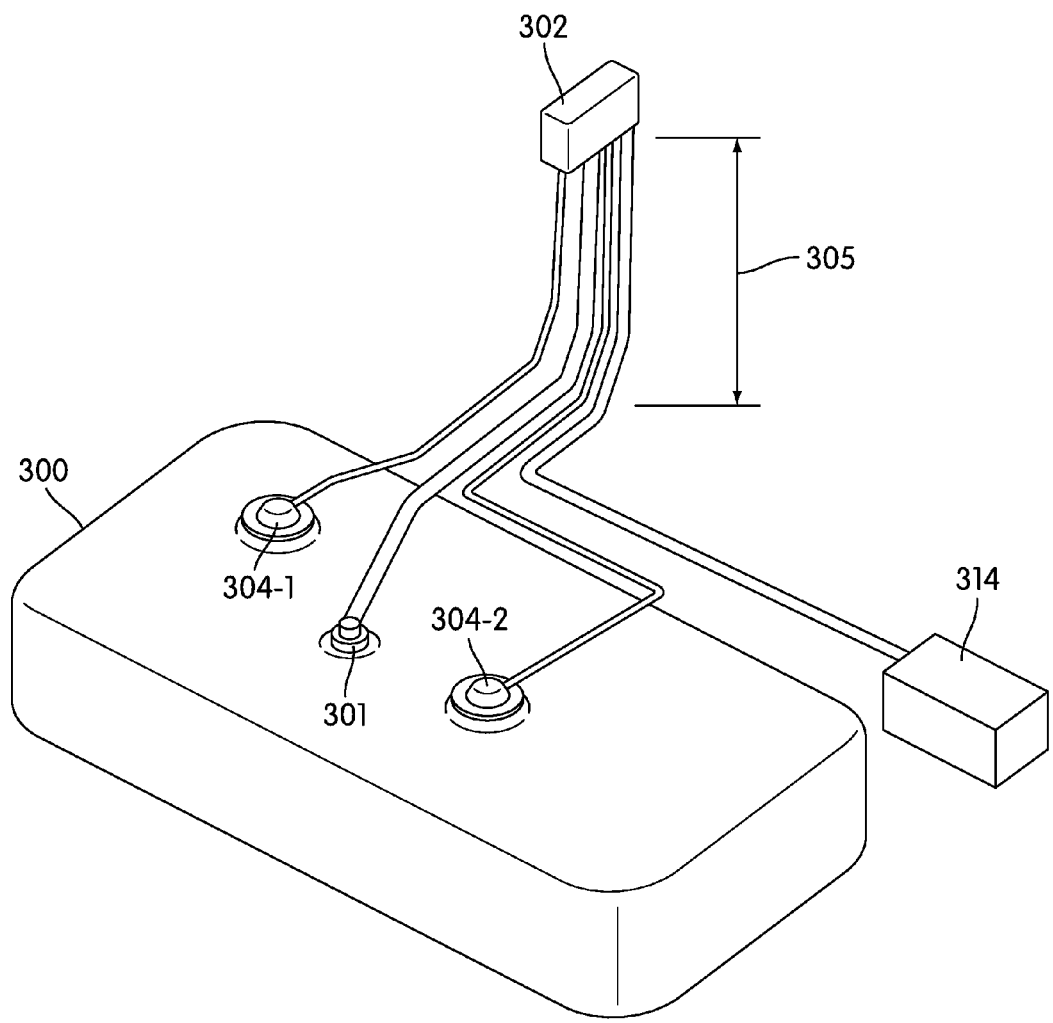
FIG. 3.1
PRIOR ART

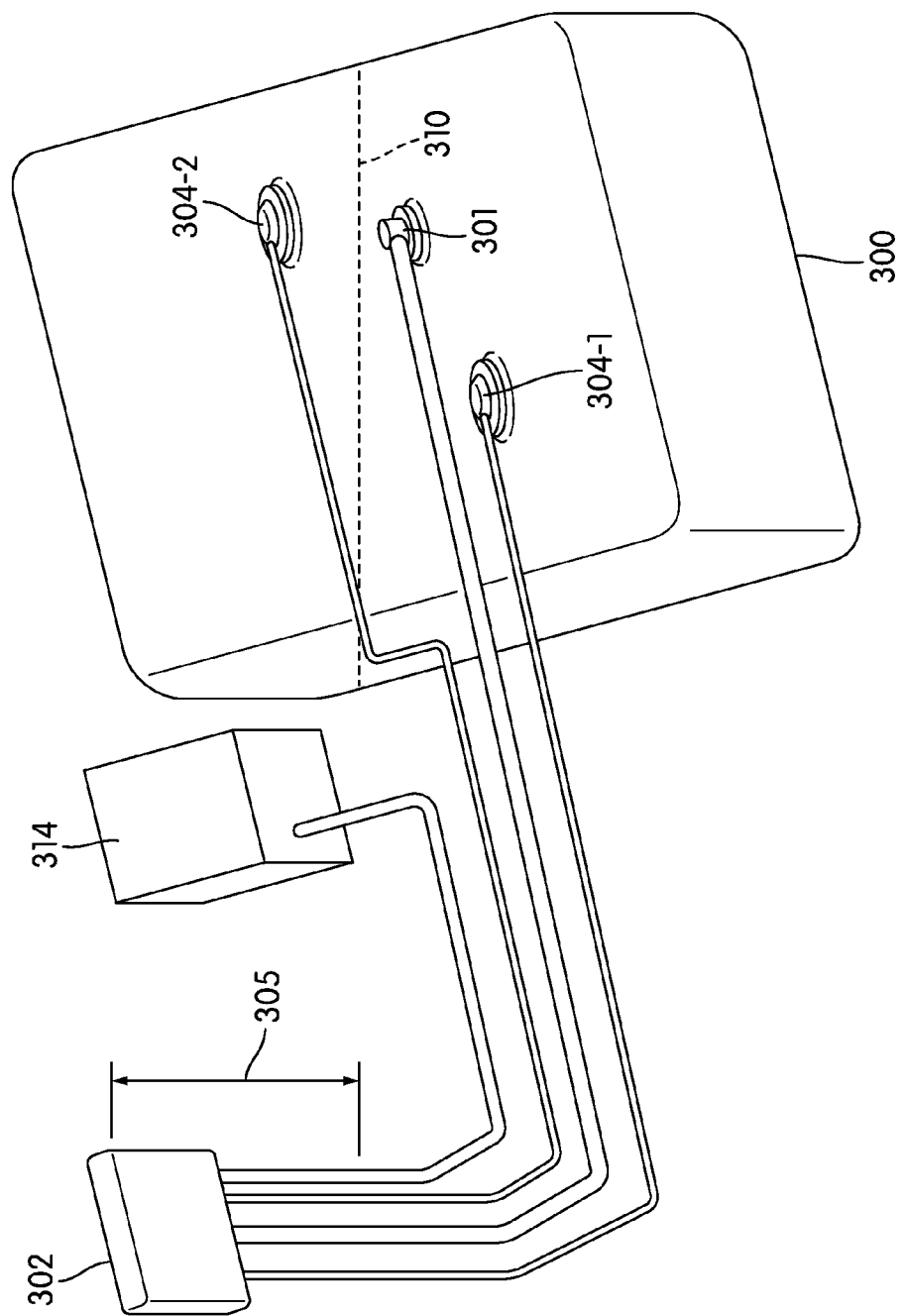
FIG. 3.2
PRIOR ART

SYSTEM AND METHOD FOR FUEL TANK TUBE ROUTING AND VALVE PLACEMENT TO PREVENT FUEL LEAKS INTO EVAPORATIVE EMISSIONS SYSTEM

BACKGROUND OF THE INVENTION

1. Field of the Invention

The present invention relates to motor vehicles and in particular to a fuel tank of a motor vehicle.

2. Description of Related Art

Motor vehicle fuel tank venting systems control the flow of fuel vapor from a vehicle fuel tank to an evaporative emission system, such a carbon canister vapor recovery device. Typically, fuel tank venting systems use valves such as pressure operated control valves, volume operated control or shutoff valves, or rollover valves, to control the passage of vapor to an evaporative emission system. While allowing the passage of vapor, the fuel tank venting systems must also prevent the flow of liquid fuel so that the liquid fuel does not reach and damage the evaporative emission system. Because the fuel tank may be inclined at different angles and orientations as a vehicle moves over varying terrain, the fuel tank venting system must prevent the flow of liquid fuel in a variety of different tank positions, and further, must accommodate a situation in which a valve might leak.

One conventional approach to preventing the flow of liquid fuel employs a half saddle or full saddle fuel tank with vent valves positioned at a high elevation point in the central region of the fuel tank, so that the tank may be tilted in any direction without submerging the valves. In this manner, the high, centrally positioned vent valves allow venting in any tilted position that the tank may assume. As an example, FIG. 1.1 illustrates a prior art half saddle fuel tank 100 having a high, centrally located vent shut float valve 102 and a high, centrally located roll over valve 104. FIG. 1.2 shows a side view of the fuel tank 100 filled to a full fuel volume and in a tilted position. As shown, the centrally located valves 102, 104 remain above the full fuel level 110 and within the vapor space 112, so as to prevent passage of liquid fuel through the valves and to the evaporative emissions canister 114.

Another conventional approach uses a tube layout that provides a sufficient head height above the liquid level in the event that fuel leaks from a valve. The tube layout allows submerging of the valve in the event of a worst case condition. Any liquid fuel that leaks past the submerged valve is unable to pass beyond the highest point in the tube, due to the head height. The liquid fuel that leaks through the valve therefore returns to the fuel tank when the tank returns to a level condition. As an example, FIG. 2.1 illustrates a prior art fuel tank 200 having a vent shut float valve 202 connected by outlet tube 203 to an evaporative emissions canister 214. The tube 203 includes a high head height portion 215 that prevents passage of liquid fuel to the evaporative emissions canister 214. FIG. 2.2 shows a side view of the fuel tank 200 filled to a full fuel volume and in a tilted position. As shown, the high head height portion 215 provides head height 205 and remains above the full fuel level 210, so as to prevent the passage of liquid fuel.

Another conventional approach uses head height and a remote valve at the top of the tube routing to control tank venting. In that configuration, the fuel level cannot reach the highest part of the tube and therefore does not enter the remote valve. As an example, FIG. 3.1 illustrates a prior art fuel tank 300 having roll over valves 304-1, 304-2, a vent shut float valve joint 301, and a remote valve and pressure control valve 302 connected to the joint 301 and positioned at a high head height 305 relative to the fuel tank 300. The valve and pressure control valve 302 is further connected to an evaporative emissions canister 314. FIG. 3.2 shows a side view of the fuel tank 300 filled to a full fuel volume and in a tilted position. As shown, the high head height 305 of the valve and pressure control valve 302 prevents passage of liquid fuel to the evaporative emissions canister 314, as the valve and pressure control valve 302 remains above the full fuel level 310.

Although the above conventional approaches may control vapor venting and limit the flow of liquid fuel, the tube and valve configurations generally are not suitable for large plan view (viewed from the top), low height (i.e., low profile) fuel tanks. A properly designed fuel system uses at a minimum one venting valve (ideal) and at most several venting valves (less ideal) that allow the fuel tank to vent when tilted at any severe angle. If the profile of a fuel tank is low, venting becomes difficult and in some cases impossible, as the valves are submerged (surrounded by fuel) and fuel leaks from the fuel tank, through the valves and tubes, and into the evaporative emission canister. The conventional techniques described above use tube routing that provides a sufficient head height to prevent fuel leaks. However, such high tube routing cannot be confined within the profile of low height fuel tanks. Manufacturers are therefore increasingly relying on zero leak valves for low height fuel tanks. Any failure in these zero leak valves can, however, cause leakage to and damage of the evaporative emission canister.

Accordingly, there remains a need for a fuel tank venting system that accommodates low profile applications while still controlling vapor control and preventing the flow of liquid to the evaporative emission canister in the event of a leaking valve.

SUMMARY OF THE INVENTION

An embodiment of the present invention provides a vehicle fuel tank venting system that uses strategically placed valves and a low profile tube routing to prevent the leakage of liquid fuel to an evaporative emission system in the event of a valve failure. The tubes may be mounted on the outer surface of the top side of the fuel tank, and in conjunction with the placement of the valves, obviates the need to route the tubes to a location away from the fuel tank with high head height. One embodiment provides two or more fuel tank valves placed such that when the tank is tilted on an angle all around, at least one valve may vent. The remaining valves may be submerged in liquid fuel and may be intended not to leak. In the event of a failure of a submerged valve, however, the tube routing may route the leaking liquid fuel to a location above the liquid level in the fuel tank, thereby preventing leakage to the evaporative emission canister. When the tank levels again, the fuel that entered the vent lines may travel back into the fuel tank.

In one aspect, the present invention may provide a fuel tank venting system having a fuel tank, a first outlet valve, a second outlet valve, a first outlet tube, and a second outlet tube. The fuel tank may have an upper wall extending generally in a horizontal direction when viewed from a side elevation view, wherein the fuel tank defines a first end region, a central region, and a second end region when viewed from a plan view. The first outlet valve may be disposed in the upper wall of the fuel tank in the first end region of the fuel tank. The second outlet valve may be disposed in the upper wall of the fuel tank in the second end region of the fuel tank. The first outlet tube may be connected to the first outlet valve, wherein the first outlet tube may be mounted to the upper wall of the fuel tank and may extend generally in a horizontal direction along the upper wall of the fuel tank from the first end region to a second end region location that is past the second outlet valve in the second end region. The second outlet tube may be connected to the second outlet valve, wherein the second outlet tube may be mounted to the upper wall of the fuel tank and may extend generally in a horizontal direction along the upper wall of the fuel tank from the second end region, through the central region, and to a first end region location proximate to the first outlet valve in the first end region, and may reverse direction extending back through the central region and to the second end region. The first outlet tube and the second outlet tube may be configured to connect to a tube in the second end region leading to an evaporative emissions canister. The first outlet valve and the second outlet valve may be positioned such that at least one of the first outlet valve and the second outlet valve may be above a full fuel level for a desired range of fuel tank tilted positions. Among the desired range of fuel tank tilted positions, when the first outlet valve is positioned below the full fuel level, at least a portion of the first outlet tube may be above the full fuel level. Among the desired range of fuel tank tilted positions, when the second outlet valve is positioned below the full fuel level, at least a portion of the second outlet tube may be above the full fuel level.

In one implementation, the first outlet valve may be one of a vent shut float valve and a roll over valve, and the second outlet valve may be one of a vent shut float valve and a roll over valve.

In another implementation, the desired range of fuel tank tilted positions may comprise 360 degrees of rotation on a tilt angle of 40 degrees.

In another implementation, the tilt angle may be within a range of about 16-22 degrees.

In another implementation, the first outlet tube and the second outlet tube may be each connected to an evaporative emissions tube in the second end region, wherein the evaporative emissions tube may be connected to an evaporative emissions canister, and wherein the evaporative emissions tube may remain substantially within a horizontal plane.

In another implementation, the first outlet tube and the second outlet tube, while extending generally in a horizontal direction, may include elevation changes to conform to surface irregularities in the upper wall of the fuel tank.

In another implementation, the first outlet tube and the second outlet tube may be connected in the second end region to a pressure control valve or a joint.

In another implementation, the first outlet tube and the second outlet tube may be connected to a pressure control valve in the second end region, and the at least a portion of the second outlet tube that may be above the full fuel level may comprise the pressure control valve.

In another implementation, when the fuel tank is viewed from the plan view, the first outlet valve and the second outlet valve may be disposed on opposite halves of the fuel tank in both in a longitudinal direction of the fuel tank and also a lateral direction of the fuel tank.

In another implementation, the first outlet tube and the second outlet tube may extend to a corner of the fuel tank in the second end region when the fuel tank is viewed from the plan view.

In another implementation, the first outlet valve, the first outlet tube, the second outlet valve, and the second outlet tube may be contained substantially within a horizontal plane.

In another implementation, the first outlet valve and the second outlet valve may be normally open and may be configured to close when submerged in fuel.

In another implementation, the fuel tank venting system may further comprise an evaporative emissions tube connected to the first outlet tube and the second outlet tube in the second end region, and an evaporative emissions canister connected to the evaporative emissions tube.

In another implementation, the evaporative emissions tube may not include any high head height sections.

In another aspect, the present invention may provide a fuel tank venting system having a fuel tank, a first outlet valve, a second outlet valve, a first outlet tube, a second outlet tube, and an evaporative emissions tube. The fuel tank may have an upper wall extending generally in a horizontal direction when viewed from a side elevation view, wherein, when viewed from a plan view, the fuel tank defines a first end region, a central region, a second end region, a first side, a second side, and a longitudinal axis extending from the first end region to the second end region. The first outlet valve may be disposed in the upper wall of the fuel tank in the first end region of the fuel tank, wherein the first outlet valve may be disposed on a side of the longitudinal axis closer to the first side than the second side. The second outlet valve may be disposed in the upper wall of the fuel tank in the second end region of the fuel tank, wherein the second outlet valve may be disposed on the side of the longitudinal axis closer to the second side than the first side. The first outlet tube may be connected to the first outlet valve, wherein the first outlet tube may be mounted to the upper wall of the fuel tank and may extend generally in a horizontal direction along the upper wall of the fuel tank from the first end region to a second end region location that is past the second outlet valve in the second end region. The first outlet tube may extend from the first outlet valve toward the first side of the fuel tank, may extend parallel and proximate to the first side, and after passing the second outlet valve, may extend toward a corner of the fuel tank in the second end region at the second side. The second outlet tube may be connected to the second outlet valve, wherein the second outlet tube may be mounted to the upper wall of the fuel tank and may extend generally in a horizontal direction along the upper wall of the fuel tank from the second end region, through the central region, and to a first end region location proximate to the first outlet valve in the first end region, and may reverse direction extending back through the central region and to the second end region. In the first end region, where the second outlet tube reverses direction, at least a portion of the second outlet tube may be disposed on the side of the longitudinal axis closer to the first side than the second side. In extending back through the central region and to the second end region, the second outlet tube may extend toward the corner of the fuel tank in the second end region at the second side. The evaporative emissions tube may be connected to the first outlet tube and the second outlet tube at the corner of the fuel tank in the second end region at the second side.

In one implementation, in extending back through the central region and to the second end region, the second outlet tube may pass the second outlet valve on a side of the second outlet valve closest to the second side.

In another implementation, the first outlet tube and the second outlet tube, while extending generally in a horizontal direction, may include elevation changes to conform to surface irregularities in the upper wall of the fuel tank.

In another implementation, the first outlet valve and the second outlet valve may be positioned such that at least one of the first outlet valve and the second outlet valve may be above a full fuel level for a desired range of fuel tank tilted positions, wherein, among the desired range of fuel tank tilted positions, when the first outlet valve is positioned below the full fuel level, at least a portion of the first outlet tube may be above the full fuel level, and wherein, among the desired range of fuel tank tilted positions, when the second outlet valve is positioned below the full fuel level, at least a portion of the second outlet tube may be above the full fuel level.

In another aspect, the present invention may provide a method for preventing liquid fuel leaking from a submerged first outlet valve of a fuel tank from reaching an evaporative emissions system connected to the fuel tank. The fuel tank may have an upper wall extending generally in a horizontal direction when viewed from a side elevation view. The fuel tank may comprise the first outlet valve and a second outlet valve and may define a first end region, a central region, and a second end region when viewed from a plan view. The method may involve positioning the first outlet valve in the upper wall of the first end region of the fuel tank; positioning the second outlet valve in the upper wall of the second end region of the fuel tank; connecting a first outlet tube to the first outlet valve, mounting the first outlet tube to the upper wall of the fuel tank, and routing the first outlet tube generally in a horizontal direction along the upper wall of the fuel tank from the first end region to past the second outlet valve in the second end region; connecting a second outlet tube to the second outlet valve, mounting the second outlet tube to the upper wall of the fuel tank, and routing the second outlet tube generally in a horizontal direction along the upper wall of the fuel tank from the second end region, through the central region, to a location proximate to the first outlet valve in the first end region, and in a reverse direction extending back through the central region and to the second end region; connecting the first outlet tube and the second outlet tube to a tube in the second end region leading to an evaporative emissions canister; positioning the first outlet valve and the second outlet valve such that at least one of the first outlet valve and the second outlet valve is above a full fuel level for a desired range of fuel tank tilted positions; routing the first outlet tube such that, among the desired range of fuel tank tilted positions, when the first outlet valve is positioned below the full fuel level, at least a portion of the first outlet tube may be above the full fuel level; and routing the second outlet tube such that, among the desired range of fuel tank tilted positions, when the second outlet valve is positioned below the full fuel level, at least a portion of the second outlet tube may be above the full fuel level.

In one implementation, the method may further comprise routing the first outlet tube and the second outlet tube, while extending generally in a horizontal direction, through elevation changes to conform to surface irregularities in the upper wall of the fuel tank.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 1.1 is a schematic diagram of an isometric view of a prior art fuel tank venting system using high, centrally positioned outlet valves;

FIG. 1.2 is a schematic diagram of a side isometric view of the fuel tank venting system shown in FIG. 1.1, with the tank in a tilted position and with the full fuel level shown;

FIG. 2.1 is a schematic diagram of an isometric view of a prior art fuel tank venting system using a high height tube routing;

FIG. 2.2 is a schematic diagram of a side isometric view of the fuel tank venting system shown in FIG. 2.1, with the tank in a tilted position and with the full fuel level shown;

FIG. 3.1 is a schematic diagram of an isometric view of a prior art fuel tank venting system using a high head height, remotely located valve;

FIG. 3.2 is a schematic diagram of a side isometric view of the fuel tank venting system shown in FIG. 3.1, with the tank in a tilted position and with the full fuel level shown;

DETAILED DESCRIPTION OF ONE EMBODIMENT

Generally, the fuel tank venting systems of the present invention may be used in connection with an engine of a motor vehicle. The invention may be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion may include a situation where the chemical potential energy of a fuel or fuel cell is converted into rotational kinetic energy or where electrical potential energy is converted into rotational kinetic energy. Engines may also include provisions for converting kinetic energy into potential energy, for example, some engines include regenerative braking systems where kinetic energy from a drivetrain is converted into potential energy. Engines may also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

Figure 4:
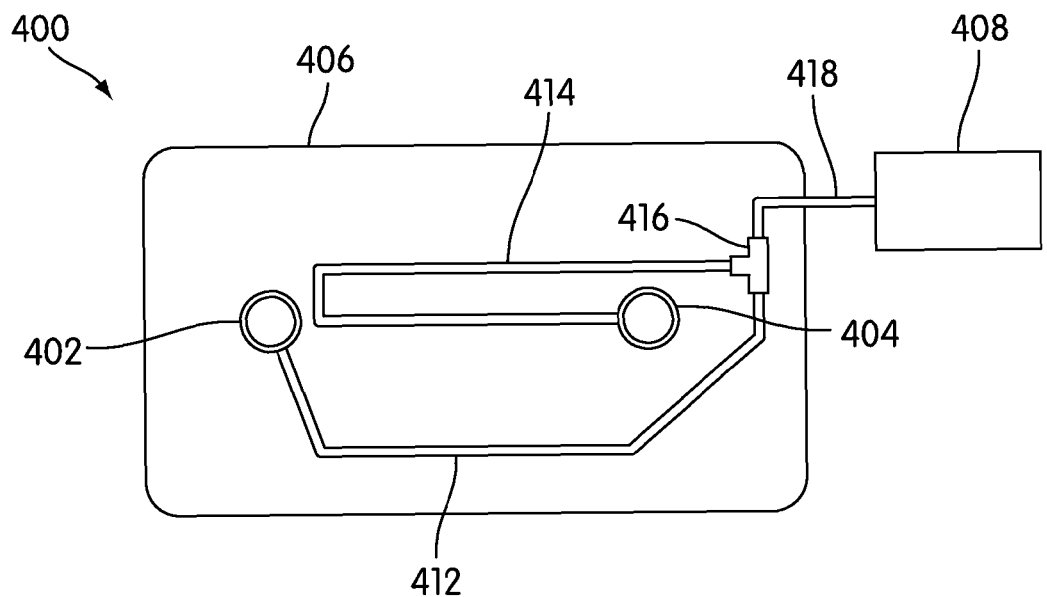
FIG. 4 is a schematic diagram of a plan view of an exemplary embodiment of a vehicle fuel tank venting system.

FIG. 4 is a schematic view of an exemplary embodiment of a fuel tank venting system 400. In some embodiments, fuel tank venting system 400 may be associated with an engine, which is not shown in FIG. 4 for purposes of clarity. Fuel tank venting system 400 may also be associated with any type of motor vehicle, including, but not limited to: cars, trucks, vans, minivans, SUVs, motorcycles, scooters, boats, personal watercraft, and aircraft.

As shown in the plan view of FIG. 4, fuel tank venting system 400 includes a first outlet valve 402 and a second outlet valve 404, which in this example are a vent shut float valve and a roll over valve, respectively. First outlet valve 402 and second outlet valve 404 may be spaced apart from each other on a fuel tank 406, and located distant from the geometric center of the fuel tank 406. In other words, the valves 402, 404 are not disposed in a central area of the fuel tank 406. Instead, the valves 402, 404 may be placed such that with the fuel tank 406 filled with a predetermined maximum volume of fuel (i.e., with the fuel tank 406 "full"), at least one of the valves may be above the full fuel level in any position of a desired range of tank positions. For example, with the tank full, at least one valve is above the full fuel level when the tank is rotated 360 degrees on a tilt angle of ≤40 degrees. In one embodiment, the tank is rotated 360 degrees on a tilt angle that is within a range of about 16-22 degrees, for example, 17 degrees or 21 degrees. In rotating a tank 360 degrees, a first portion of the tank along a first angular displacement may be tilted to a desired tilt angle, after which the tank may then be moved such that a second portion of the tank along a next incremental angular displacement may be tilted to the desired tilt angle, all with respect to a stationary center rotation point of the tank. Remaining portions of the tank along successive incremental angular displacements may then be tilted to the desired tilt angle, until the rotation returns to the first angular displacement.

Although FIG. 4 illustrates one example of the possible types of valves 402, 404, other types and combinations are possible. For example, valve 402 may be a roll over valve and valve 404 may be a vent shut float valve, or both valves 402, 404 may be roll over valves.

Figure 8:
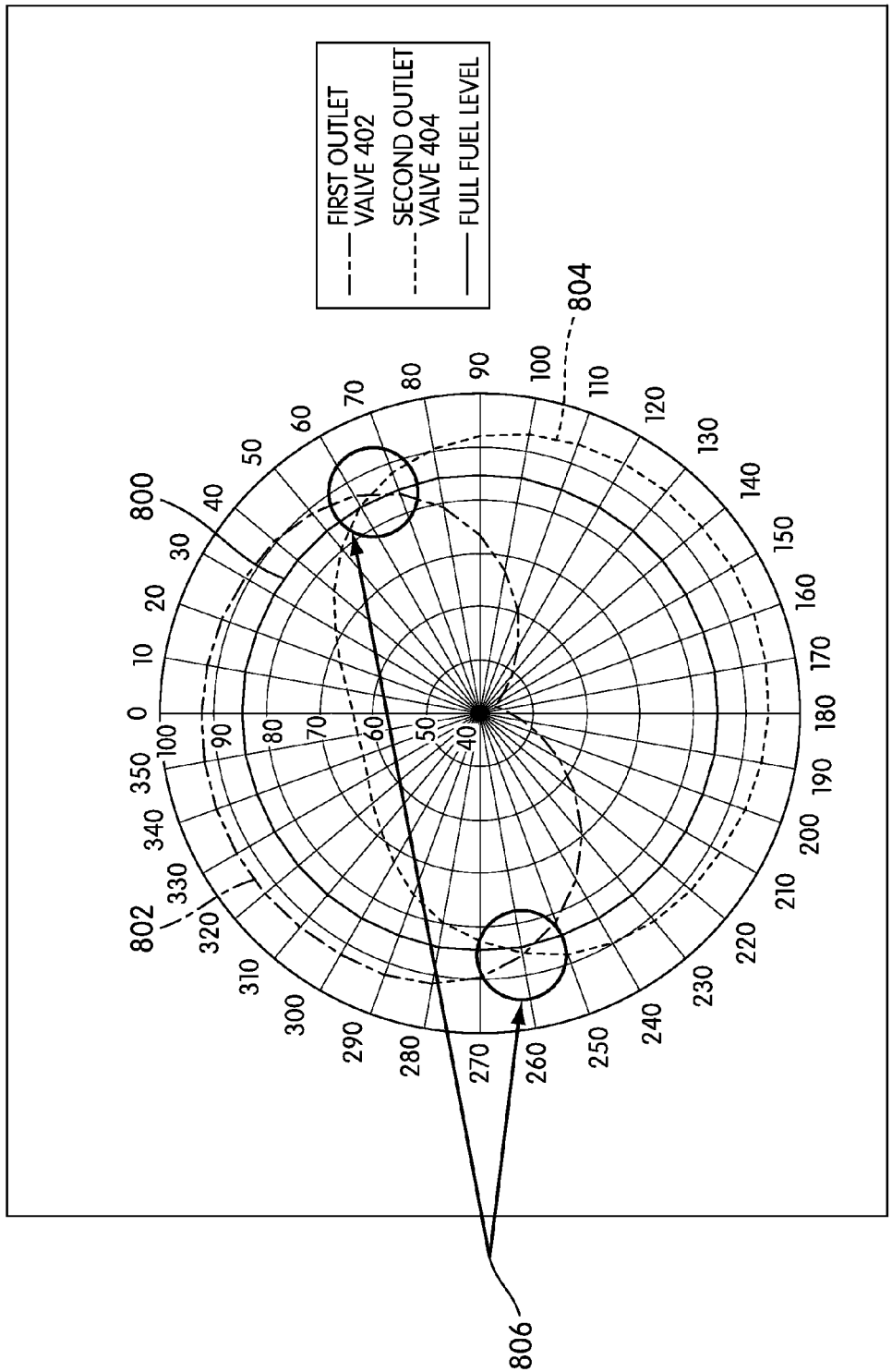
FIG. 8 is a polar grid depicting an exemplary valve placement according to an embodiment of the present invention.

FIG. 8 graphically illustrates the relative valve placement according to an embodiment of the present invention. As shown, the lines through the origin of the polar grid correspond to fixed values of angular displacement of the fuel tank, i.e., ranging from 0 to 360 degrees in increments of 10 degrees. The circles centered at the origin correspond to fixed values of radii, corresponding to volumes ranging from 40 to 100% of a maximum volume, in increments of 10%. As shown on the polar grid, the full fuel level line 800, which may correspond, for example, to approximately 85% of a maximum volume, is constant for any position of the fuel tank as the tank rotates 360 degrees on a tilt angle within a range of about 16-22 degrees (e.g., about 17 degrees or 21 degrees), with a center rotation point of the tank stationary. The volume limits above which the two valves are submerged, vary as the tank is rotated, as represented by the second outlet valve line 804 and the first outlet valve line 802. At any given angular position of the full fuel tank, at least one of the valves is above the full fuel level line 800. For instance, as shown, with the portion of the tank at an angular displacement of about 30 degrees tilted at a desired tilt angle, the second outlet valve 404 (having a volume limit of about 70%) is submerged below the full fuel level, while the first outlet valve 402 (having a volume limit of about 90%) is positioned above the full fuel level. Likewise, with the portion of the tank at an angular displacement of about 230 degrees tilted at the desired tilt angle, the second outlet valve 404 (having a volume limit of about 90%) is positioned above the full fuel level, while the first outlet valve 402 (having a volume limit of about 70%) is submerged below the full fuel level. The full fuel level may be determined based on a full volume of a tank, an unusable volume of the tank, and a volume displaced by a fuel pump module associated with the tank. In an embodiment, full fuel level is 105% of the sum of a full volume of a tank, an unusable volume of the tank, and a volume displaced by a fuel pump module associated with the tank.

As shown in FIG. 8, as the fuel tank is rotated, the valves vary somewhat inversely in elevation and volume limit, and crossover each other at two different points, shown in the circled regions 806 on the polar grid. To maintain at least one valve above the full fuel level, these crossover points should be outside the full fuel level line 800 shown on the polar grid.

Although FIG. 8 depicts a polar grid for a particular two-valve arrangement in a particular fuel tank, one of ordinary skill in the art would appreciate that the present invention is not limited to the particular polar grid shown in FIG. 8, nor a particular valve arrangement or fuel tank. Rather, the present invention should be considered broadly applicable to any fuel tank and valve arrangement that conforms to the parameters shown in FIG. 8, namely, that at least one valve is above the full fuel level line in any position of a desired range of tank positions (which also means that the crossover points are above the full fuel level line).

Figure 5:
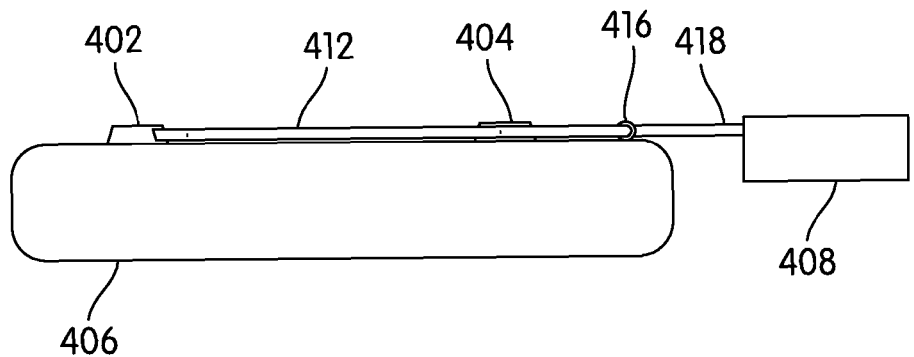
FIG. 5 is a schematic diagram of a side view of the vehicle fuel tank venting system shown in FIG. 4.

To facilitate low profile applications, the fuel tank 406 has a limited height, such as is shown in the exemplary side view of FIG. 5. Consistent with that low profile, the valves 402, 404 may be located substantially within or adjacent to (either inside or outside) the horizontal plane of the upper wall of the fuel tank 406. Although the elevation of the valves 402, 404 may vary somewhat to conform to the contours and undulations of the fuel tank 406 that are necessary to cooperate with other components of a vehicle, the valves 402, 404 may be positioned low relative to the overall upper wall of the fuel tank 406 and may not be placed in a high position as would be found, for example, on prior art fuel tank venting systems employing centrally placed, high elevation valve arrangements such as that shown in FIGS. 3.1 and 3.2.

In addition to the placement of the valves 402, 404, a further aspect of the present invention provides interior or exterior outlet tube routing that prevents fuel that is leaking from a submerged valve 402 or 404 from reaching and damaging an evaporative emissions canister 408. Under ideal conditions, first outlet valve 402 and second outlet valve 404 operate as "zero-leak" valves that close when submerged in fuel, thereby preventing passage of liquid fuel. However, when ideal conditions are not achievable, for example due to factors such as manufacturing variances, contamination in fuel, and wear, valves 402, 404 may leak and allow liquid fuel to pass into the outlet tubes connecting the valves 402, 404 to the evaporative emissions canister 408. Thus, to account for such leak conditions, at least one of the outlet tubes connecting a first valve of valves 402 or 404 to the evaporative emissions canister, may be mounted to the outside or inside of the upper wall of the fuel tank and may be routed generally horizontally to a first location proximate to the second valve and then back past the first valve to a second location that is proximate to the perimeter of the fuel tank and that is farther from the second valve than the first valve is from the second valve. From that second location, an additional tube may extend beyond the fuel tank and to the canister. The outlet tube connecting the second valve may be mounted to the outside or inside of the upper wall of the fuel tank and routed generally horizontally in a direction toward and past the first valve connected with the out-and-back tube, and may be connected to the out-and-back tube at the second location proximate to the perimeter of the fuel tank. Although the elevations of the tubes from valves 402, 404 may vary somewhat to conform to the contours, undulations, and other surface irregularities of the fuel tank 406 that are necessary to cooperate with other components of a vehicle, the tubes may be routed generally horizontally to conform to low profile requirements.

FIG. 4 illustrates an exemplary outlet tube routing that is external to a fuel tank 406 and connects first outlet valve 402 and second outlet valve 404 to evaporative emissions canister 408. As shown, vent tube 414 first extends along the outside surface of the upper wall of the fuel tank 406 generally horizontally in a direction toward first outlet valve 402 up to a first location proximate to first outlet valve 402. Vent tube 414 then reverses direction and extends back toward and past second outlet valve 404, to a second location 416 that is proximate to the perimeter of fuel tank 406 and that is farther from first outlet valve 402 than second outlet valve 404 is from first outlet valve 402. At that second location, vent tube 414 may be connected to evaporative emissions tube 418 leading to the evaporative emissions canister 408. As also shown, the exemplary tube routing also includes vent tube 412 connected to first outlet valve 402. Vent tube 412 may be, for example, an on-board refueling vapor recovery tube. Tube 412 extends along the outside surface of the upper wall of the fuel tank 406 generally horizontally in a direction generally toward second outlet valve 404 and passes second outlet valve 404 to connect to the evaporative emissions tube 418 at the second location 416 proximate to the perimeter of the fuel tank 406.

Figure 6:
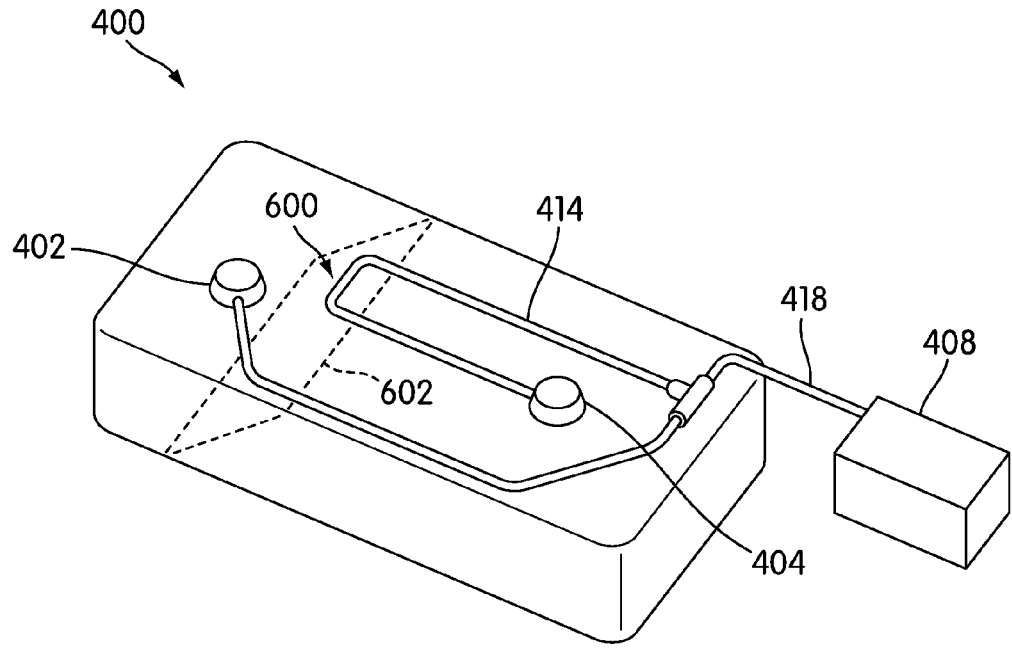
FIG. 6 is a schematic diagram of a side isometric view of the vehicle fuel tank venting system shown in FIG. 4, positioned at a representative tilt and with the full fuel level shown.
Figure 7:
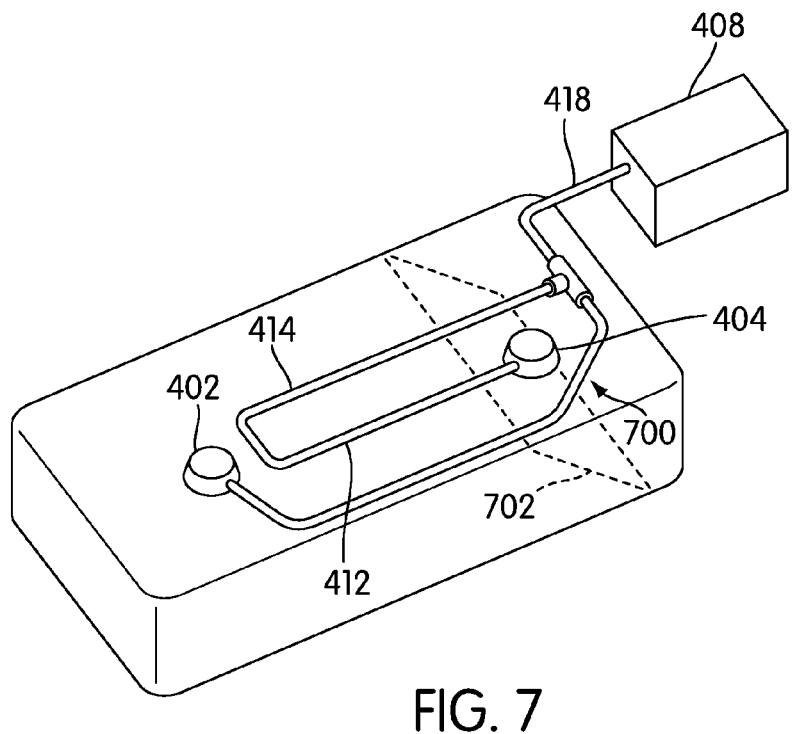
FIG. 7 is a schematic diagram of a side isometric view of the vehicle fuel tank venting system shown in FIG. 4, opposite to the side shown in FIG. 6, positioned at a representative tilt, and with the full fuel level shown.

As exemplified in FIGS. 4 and 5, the tube routing of the present invention ensures that tubing leading from a submerged valve has at least one portion that may be positioned at an elevation higher (e.g., about 5 mm higher) than the full fuel level for any position of a desired range of fuel tank positions (e.g., any position of the tank rotated 360 degrees on a tilt angle within a range of about 16-22 degrees). For example, as shown in FIG. 6, with the fuel tank 400 tilted downward along its longitudinal axis toward valve 404, the tube 414 connecting valve 404 to evaporative emissions tube 418 has a portion 600 proximate to valve 402 that may be above the full fuel level 602. As another example, FIG. 7 shows the fuel tank 400 tilted downward along its longitudinal axis toward valve 402, with the tube 412 connecting valve 402 to evaporative emissions tube 418 having a portion 700 above the full fuel level 702.

As shown in the representative schematics of FIGS. 4-7, the valve placement and tube routing enable a desirably low profile and accommodate a wide range of tank tilting. The spaced apart and decentralized placement of the valves ensures that at least one valve may be above the liquid fuel level for any position of a desired range of tank positions. In addition, routing a tube of one valve towards the other valve and back ensures that a leak in either valve, when submerged, will not result in liquid fuel reaching the evaporative emissions canister. Essentially, the out-and-back tube routing provides the desired high head height when the fuel tank is tilted. In this manner, the tube routing protects against liquid fuel leakage when such a leakage might occur, i.e., when the valve is submerged. Moreover, the out-and-back tube routing may be provided in substantially the same plane as the upper wall of the fuel tank, thereby accommodating low profile requirements and avoiding the extended vertical tubing configurations known in the prior art. In conforming substantially to the plane of the upper wall of the fuel tank, the tube routing may be external and/or internal to the fuel tank, i.e., on an outside and/or inside surface of the upper wall.

Figure 9:
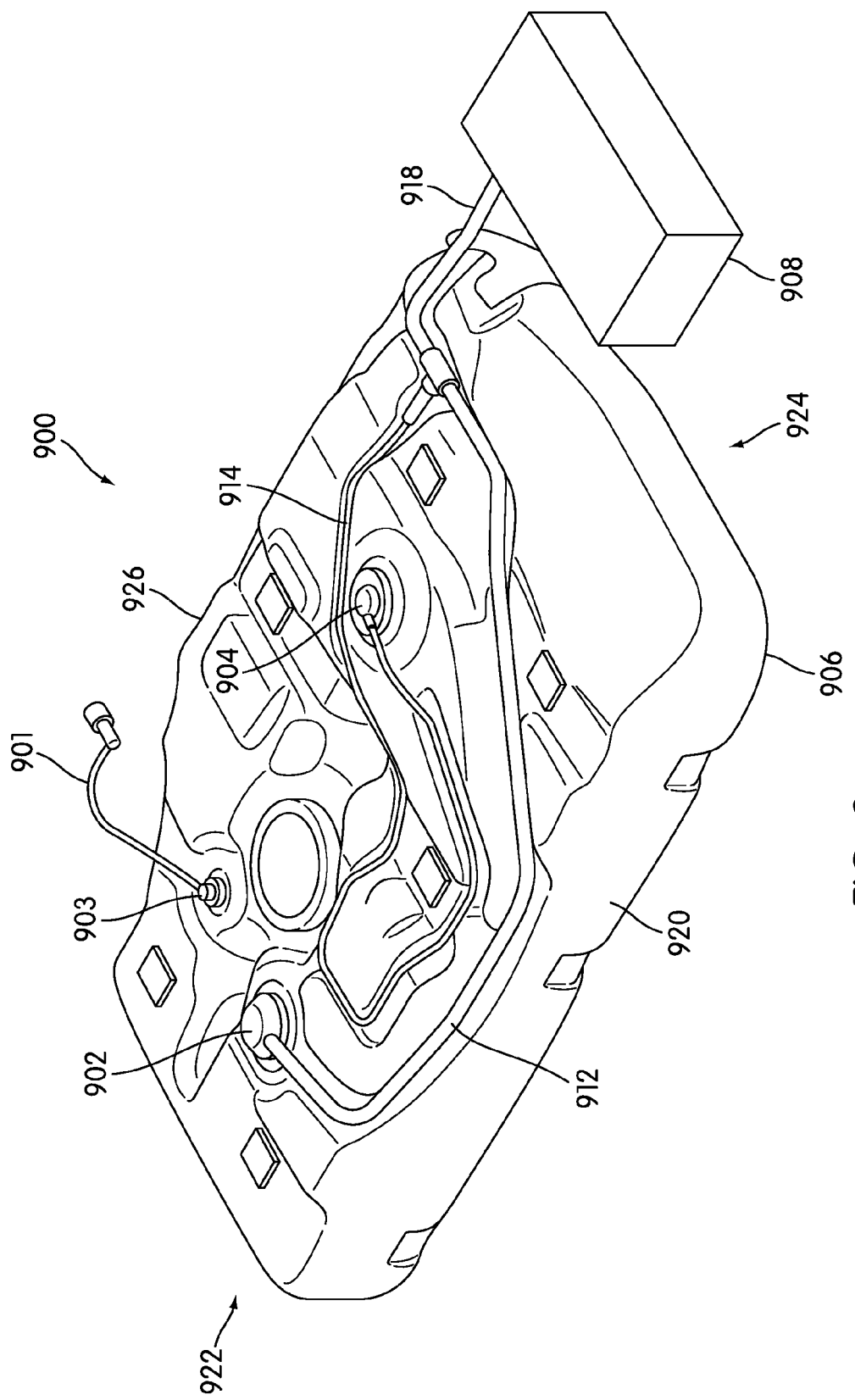
FIG. 9 is a schematic diagram of an isometric view of an exemplary implementation a vehicle fuel tank venting system.
Figure 10:
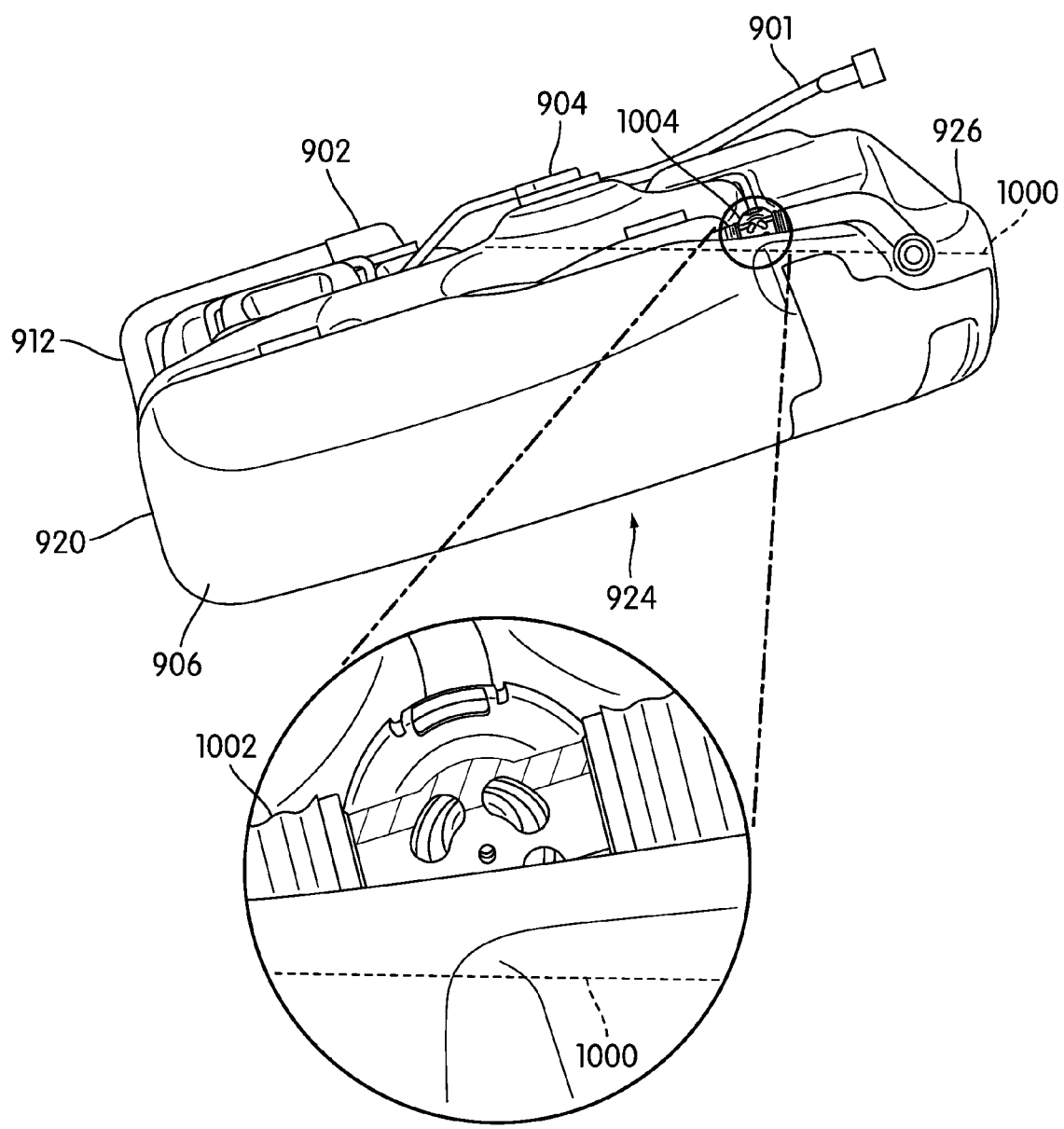
FIG. 10 is a schematic diagram illustrating an isometric, partially cut away, side view of the vehicle fuel tank venting system shown in FIG. 9, positioned at a representative tilt and with the full fuel level shown.
Figure 11:
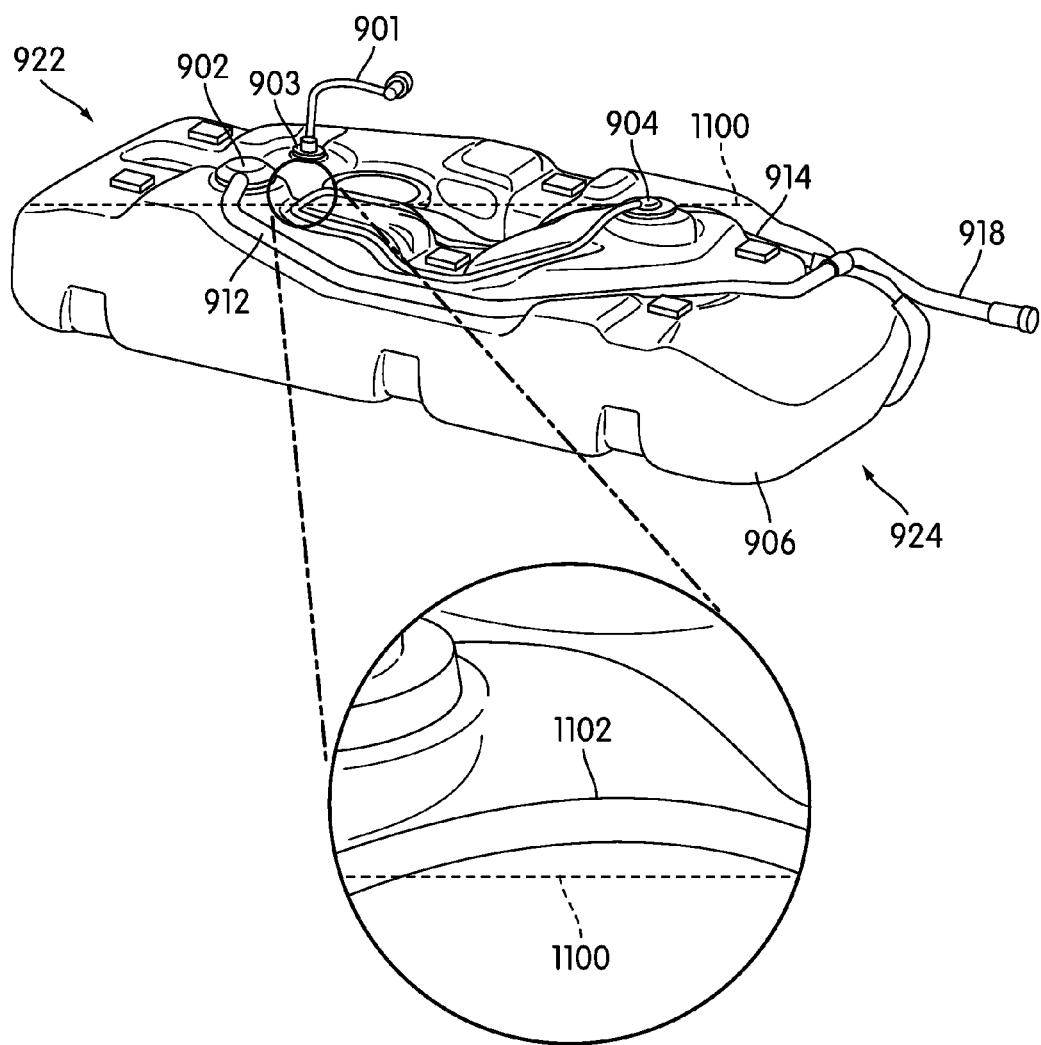
FIG. 11 is a schematic diagram illustrating another isometric, partially cut away, side view of the vehicle fuel tank venting system shown in FIG. 9, positioned at a representative tilt and with the full fuel level shown.

With the general principles of FIGS. 4-8 in mind, FIGS. 9-11 illustrate a specific implementation of a low profile fuel tank venting system 900 having strategically placed valves and exterior outlet tube routing that prevents liquid fuel leaks into evaporative emissions systems. As shown, the fuel tank venting system 900 includes a fuel tank 906, a first outlet valve 902 (which in this example may be a vent shut float valve), a second outlet valve 904 (which in this example may be a roll over valve), a fill line 901, and a pressure control valve 903. Pressure control valve 903 may be a one-way check valve, for example. Valves 902, 904 may be normally open and may be intended to close when submerged. To enable venting and vapor recovery, valves 902, 904 may be connected to outlet vent tubes leading to an evaporative emissions system. A vent tube may be, for example, an on-board refueling vapor recovery tube. As shown, vent tube 912 connects first outlet valve 902 to evaporative emissions tube 918, while vent tube 914 connects second outlet valve 904 to evaporative emissions tube 918. Evaporative emissions tube 918 connects to an evaporative emissions canister 908.

As shown in FIG. 9, in this example, vent tubes 912, 914 may be mounted to the outside surface of the upper wall of fuel tank 906 and extend generally in a horizontal direction along the outside surface of the upper wall of the fuel tank 906. The vent tubes 912, 914 may vary in elevation somewhat to conform to contours, undulations, and other surface irregularities in the upper wall of the fuel tank 906, but may not appreciably rise in a vertical direction so that the fuel tank and venting system maintain an overall low profile. Notably, evaporative emissions tube 918 also extends generally in a horizontal direction to the canister 908 without requiring a vertical rise such as the high head height sections known in the prior art.

In this particular implementation, vent tube 912 from the first outlet valve 902 may be routed along a first side 920 of the tank 906 (lower side in FIG. 9) from a first end region 922 (on the left in FIG. 9) where the first outlet valve 902 is located towards an opposite second end region 924 (on the right in FIG. 9). As shown, the vent tube 912 beyond the second outlet valve 904 (in the second end region 924) may then be directed from the first side 920 of the tank towards an opposite second side 926 (upper side in FIG. 9) where the vent tube 912 exits from the tank 906 adjacent a corner of the tank 906. The tube 914 for the second outlet valve 904 may be routed from the second outlet valve 904 toward the location of the first outlet valve 902 in the first end region 922 and returned in an out-and-back manner. The vent tube 914 may then be directed towards the second side 926 of the tank 906 and past the second outlet valve 904 where it joins the vent tube 912 adjacent the corner of the tank 906 at which the evaporative emissions tube 918 exits from the tank 906. The vent tube 912 borders a portion of the tank 906 on which the vent tube 914 is located so as to partially surround the vent tube 914.

As shown in FIG. 9, valves 902, 904 may be located on opposite halves of the fuel tank 906, both in the longitudinal direction of the tank 906 and also the lateral direction of the tank 906. In addition, valves 902, 904 may be located in the end regions 922, 924, respectively, of the fuel tank 906, away from the geometric center of the tank 906 (when viewed from a plan view). This particular valve placement corresponds to the polar grid shown in FIG. 8 and ensures that one of valves 902, 904 may be above a desired full fuel level when the tank 906 is rotated 360 degrees at a tilt angle within a range of about 16-22 degrees, for example, 17 degrees or 21 degrees.

For illustrative purposes, FIGS. 10 and 11 depict the fuel tank 906 of FIG. 9 in two different tilted positions (with the canister 908 not shown for clarity). In FIG. 10, fuel tank 906 is positioned on a tilt angle within a range of about 16-22 degrees with the first side 920 lower than the second side 926, with the first outlet valve 902 submerged below the full fuel level 1000, and with the second outlet valve 904 positioned above the full fuel level 1000. In this position, if the first outlet valve 902 were to leak, there may be a potential for liquid fuel to leak into the evaporative emissions canister (not shown for clarity). However, the routing of vent tube 912 prevents that leakage. Specifically, as shown in FIG. 10, a portion 1002 of vent tube 912 may be above the full fuel level 1000, which is the head height. Any leaking liquid fuel through vent tube 912 would therefore not pass any higher than the full fuel level 1000. In addition, in this particular implementation, a pressure control valve 1004 (e.g., a one-way valve) may be provided at the juncture of the vent tube 912, the vent tube 914, and the evaporative emissions tube 918. Pressure control valve 1004 may also be positioned above the full fuel level 1000, thereby further preventing passage of any leaking liquid fuel. Alternatively, a joint may be used instead of pressure control valve 1004.

In FIG. 11, fuel tank is positioned on a tilt angle within a range of about 16-22 degrees with the first end region 922 higher than the second end region 924, with the second outlet valve 904 submerged below the full fuel level 1100, and with the first outlet valve 902 positioned above the full fuel level 1100. In this position, if the second outlet valve 904 were to leak, there is a potential for liquid fuel to leak into the evaporative emissions canister (not shown for clarity). However, the routing of tube 914 prevents that leakage. Specifically, as shown in FIG. 11, a portion 1102 of tube 914 may be above the full fuel level 1100, which is the head height. Any leaking liquid fuel through tube 914 would therefore not pass any higher than the full fuel level 1100.

Although embodiments of the invention disclosed above include particular numbers, types, combinations, and placements of outlet valves and tubes of a fuel tank, one of ordinary skill in the art would appreciate that the invention is not limited to those particular numbers, types, combinations, and placements. For example, with reference to FIG. 4, a fuel tank may include more than the two outlet valves 402, 404, and various combinations of the types of outlet valves, such as vent shut float valves and roll over valves. Therefore, notwithstanding the particular benefits associated with the embodiments disclosed herein, the invention should be considered broadly applicable to any number, types, combinations, and placements of outlet valves and tubes, in a low profile fuel tank application, that prevent the leakage of liquid fuel into an evaporative emission system.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A fuel tank venting system comprising:
a fuel tank having an upper wall extending generally in a horizontal direction when viewed from a side elevation view, wherein the fuel tank defines a first end region, a central region, and a second end region when viewed from a plan view;
a first outlet valve disposed in the upper wall of the fuel tank in the first end region of the fuel tank;
a second outlet valve disposed in the upper wall of the fuel tank in the second end region of the fuel tank;
a first outlet tube connected to the first outlet valve, wherein the first outlet tube is mounted to the upper wall of the fuel tank and extends generally in a horizontal direction along the upper wall of the fuel tank from the first end region to a second end region location that is past the second outlet valve in the second end region; and
a second outlet tube connected to the second outlet valve, wherein the second outlet tube is mounted to the upper wall of the fuel tank and extends generally in a horizontal direction along the upper wall of the fuel tank from the second end region, through the central region, and to a first end region location proximate to the first outlet valve, and reverses direction extending back through the central region and to the second end region,
wherein the first outlet tube and the second outlet tube are configured to connect to a tube in the second end region leading to an evaporative emissions canister,
wherein the first outlet valve and the second outlet valve are positioned such that at least one of the first outlet valve and the second outlet valve is above a full fuel level for a desired range of fuel tank tilted positions,
wherein, among the desired range of fuel tank tilted positions, when the first outlet valve is positioned below the full fuel level, at least a portion of the first outlet tube is above the full fuel level, and
wherein, among the desired range of fuel tank tilted positions, when the second outlet valve is positioned below the full fuel level, at least a portion of the second outlet tube is above the full fuel level.

2. The system of claim 1, wherein the first outlet valve is one of a vent shut float valve and a roll over valve, and the second outlet valve is one of a vent shut float valve and a roll over valve.

3. The system of claim 1, wherein the desired range of fuel tank tilted positions comprises 360 degrees of rotation on a tilt angle of 40 degrees.

4. The system of claim 3, the tilt angle is within a range of about 16-22 degrees.

5. The system of claim 1, wherein the first outlet tube and the second outlet tube are each connected to an evaporative emissions tube in the second end region, wherein the evaporative emissions tube is connected to an evaporative emissions canister, and wherein the evaporative emissions tube remains substantially within a horizontal plane.

6. The system of claim 1, wherein the first outlet tube and the second outlet tube, while extending generally in a horizontal direction, include elevation changes to conform to surface irregularities in the upper wall of the fuel tank.

7. The system of claim 1, wherein the first outlet tube and the second outlet tube are connected in the second end region to one of a pressure control valve and a joint.

8. The system of claim 1, wherein the first outlet tube and the second outlet tube are connected to a pressure control valve in the second end region, and wherein the at least a portion of the second outlet tube that is above the full fuel level comprises the pressure control valve.

9. The system of claim 1, wherein, when the fuel tank is viewed from the plan view, the first outlet valve and the second outlet valve are disposed on opposite halves of the fuel tank in both in a longitudinal direction of the fuel tank and also a lateral direction of the fuel tank.

10. The system of claim 1, wherein the first outlet tube and the second outlet tube extend to a corner of the fuel tank in the second end region when the fuel tank is viewed from the plan view.

11. The system of claim 1, wherein the first outlet valve, the first outlet tube, the second outlet valve, and the second outlet tube are contained substantially within a horizontal plane.

12. The system of claim 1, wherein the first outlet valve and the second outlet valve are normally open and are configured to close when submerged in fuel.

13. The system of claim 1, further comprising:
an evaporative emissions tube connected to the first outlet tube and the second outlet tube in the second end region; and
an evaporative emissions canister connected to the evaporative emissions tube.

14. The system of claim 13, wherein the evaporative emissions tube does not include any high head height sections.

15. A fuel tank venting system comprising:
a fuel tank having an upper wall extending generally in a horizontal direction when viewed from a side elevation view, wherein, when viewed from a plan view, the fuel tank defines a first end region, a central region, a second end region, a first side, a second side, and a longitudinal axis extending from the first end region to the second end region;
a first outlet valve disposed in the upper wall of the fuel tank in the first end region of the fuel tank, wherein the first outlet valve is disposed on a side of the longitudinal axis closer to the first side than the second side;
a second outlet valve disposed in the upper wall of the fuel tank in the second end region of the fuel tank, wherein the second outlet valve is disposed on the side of the longitudinal axis closer to the second side than the first side;
a first outlet tube connected to the first outlet valve,
wherein the first outlet tube is mounted to the upper wall of the fuel tank and extends generally in a horizontal direction along the upper wall of the fuel tank from the first end region to a second end region location that is past the second outlet valve in the second end region,
wherein the first outlet tube extends from the first outlet valve toward the first side of the fuel tank, extends parallel and proximate to the first side, and after passing the second outlet valve, extends toward a corner of the fuel tank in the second end region at the second side; and
a second outlet tube connected to the second outlet valve,
wherein the second outlet tube is mounted to the upper wall of the fuel tank and extends generally in a horizontal direction along the upper wall of the fuel tank from the second end region, through the central region, and to a first end region location proximate to the first outlet valve in the first end region, and reverses direction extending back through the central region and to the second end region,
wherein, in the first end region, where the second outlet tube reverses direction, at least a portion of the second outlet tube is disposed on the side of the longitudinal axis closer to the first side than the second side,
wherein, in extending back through the central region and to the second end region, the second outlet tube extends toward the corner of the fuel tank in the second end region at the second side; and
an evaporative emissions tube connected to the first outlet tube and the second outlet tube at the corner of the fuel tank in the second end region at the second side.

16. The system of claim 15, wherein, in extending back through the central region and to the second end region, the second outlet tube passes the second outlet valve on a side of the second outlet valve closest to the second side.

17. The system of claim 15, wherein the first outlet tube and the second outlet tube, while extending generally in a horizontal direction, include elevation changes to conform to surface irregularities in the upper wall of the fuel tank.

18. The system of claim 15, wherein the first outlet valve and the second outlet valve are positioned such that at least one of the first outlet valve and the second outlet valve is above a full fuel level for a desired range of fuel tank tilted positions,
wherein, among the desired range of fuel tank tilted positions, when the first outlet valve is positioned below the full fuel level, at least a portion of the first outlet tube is above the full fuel level, and
wherein, among the desired range of fuel tank tilted positions, when the second outlet valve is positioned below the full fuel level, at least a portion of the second outlet tube is above the full fuel level.

19. A method for preventing liquid fuel leaking from a submerged first outlet valve of a fuel tank from reaching an evaporative emissions system connected to the fuel tank,
wherein the fuel tank has an upper wall extending generally in a horizontal direction when viewed from a side elevation view,
wherein the fuel tank defines a first end region, a central region, and a second end region when viewed from a plan view, and
wherein the fuel tank comprises the first outlet valve and a second outlet valve,
the method comprising:
positioning the first outlet valve in the upper wall of the first end region of the fuel tank;
positioning the second outlet valve in the upper wall of the second end region of the fuel tank;
connecting a first outlet tube to the first outlet valve, mounting the first outlet tube to the upper wall of the fuel tank, and routing the first outlet tube generally in a horizontal direction along the upper wall of the fuel tank from the first end region to past the second outlet valve in the second end region;
connecting a second outlet tube to the second outlet valve, mounting the second outlet tube to the upper wall of the fuel tank, and routing the second outlet tube generally in a horizontal direction along the upper wall of the fuel tank from the second end region, through the central region, to a location proximate to the first outlet valve in the first end region, and in a reverse direction extending back through the central region and to the second end region;

connecting the first outlet tube and the second outlet tube to a tube in the second end region leading to an evaporative emissions canister;

positioning the first outlet valve and the second outlet valve such that at least one of the first outlet valve and the second outlet valve is above a full fuel level for a desired range of fuel tank tilted positions;

routing the first outlet tube such that, among the desired range of fuel tank tilted positions, when the first outlet valve is positioned below the full fuel level, at least a portion of the first outlet tube is above the full fuel level; and routing the second outlet tube such that, among the desired range of fuel tank tilted positions, when the second outlet valve is positioned below the full fuel level, at least a portion of the second outlet tube is above the full fuel level.

20. The method of claim 19, further comprising routing the first outlet tube and the second outlet tube, while extending generally in a horizontal direction, through elevation changes to conform to surface irregularities in the upper wall of the fuel tank.

* * * * *